United States Patent [19]
Lane et al.

[11] Patent Number: 4,768,143
[45] Date of Patent: Aug. 30, 1988

[54] APPARATUS AND METHOD USING ADAPTIVE GAIN SCHEDULING ALGORITHM

[75] Inventors: John D. Lane, Fairfax, Va.; Thomas J. Scheib, Chesterland, Ohio

[73] Assignee: The Babcock & Wilcox Company, New Orleans, La.

[21] Appl. No.: 916,775

[22] Filed: Oct. 9, 1986

[51] Int. Cl.$^4$ ............................................. G05B 13/00
[52] U.S. Cl. .................................. 364/157; 364/160; 364/162
[58] Field of Search .............................. 364/148–165; 318/561, 609, 610

[56] References Cited

U.S. PATENT DOCUMENTS

| | | | |
|---|---|---|---|
| 4,349,869 | 9/1982 | Prett et al. | 364/159 |
| 4,368,510 | 1/1983 | Anderson | 364/162 |
| 4,407,013 | 9/1983 | Arcara | 364/162 |
| 4,539,633 | 9/1985 | Shigemasa | 364/162 |
| 4,563,735 | 1/1986 | Hiroi et al. | 364/160 |
| 4,607,326 | 8/1986 | Mori et al. | 364/162 |
| 4,641,235 | 2/1987 | Shigemasa et al. | 364/162 |
| 4,679,136 | 7/1987 | Shigemasa | 364/162 |

*Primary Examiner*—Jerry Smith
*Assistant Examiner*—Allen MacDonald
*Attorney, Agent, or Firm*—Vytas R. Matas; Robert J. Edwards

[57] ABSTRACT

A self-tuning system and method for controlling a process based on a measured parameter comprises modular parameter estimators and parameter controllers which are used in conjunction with the process and which receive as an input the measured parameter. An internal model controller is used as one of the parameter converters and incorporates a feed forward index which is used for gain scheduling. Regression analysis is also used in conjunction with the conventional gain scheduling to more accurate refine the control action. A limiter is also used in conjunction with the regression analysis to avoid an overly high or overly low correction signal for the controller.

6 Claims, 7 Drawing Sheets

CONSTANT GAIN SCHEDULE

APPARATUS AND METHOD USING ADAPTIVE GAIN SCHEDULING ALGORITHM

FIELD AND BACKGROUND OF THE INVENTION

The present invention relates in general to the field of process control, and in particular to a new and useful arrangement which utilizes parameter estimation, different types of parameter conversion and gain scheduling to produce a self-tuning control for a process.

Process performance can be improved by utilizing self-tuning control theory. This improvement can be substantial for processes with unknown or changing dynamics and processes that exhibit non-linear behavior. Self-tuning control can also improve the performance of simple process control loops since periodic tuning of these loops is often neglected. See Kalman, R. E., "Design of a Self-Optimizing Control System", AM. Soc. Mech. Engr. Trans., 80,1958; Astrom, K. J. and B. Wittenmark, "On Self-Tuning Regulators" Automatica, 9, 1973; and Clarke, D. W. and P. Gawthrop, "Self-Tuning Controller", Proc. IEE, 122,1975.

In spite of potential advantages of self-tuning control, this theory has had little impact in practice. Many practical difficulties are associated with self-tuning controls which are comprehensively discussed in the first two articles listed above. Problem areas include start-up, long term operation, unknown or varying process time delays and high order of rapidly changing process dynamics. See Wittenmark, B. and K. Astrom, "Practical Issues in the Implementation of Self-Tuning Control", Automatica, 20, 1984.

Also, the number of parameters required to specified current self-tuning control generally exceeds the two or three parameters necessary for conventional PID control. While a significant amount of research addressed these problems during the past decade many problem areas still exist. Until now, self-tuning control theory was not suitable for general application to industrial control problems.

Initially, self-tuning control theory focused on implicit algorithms. These algorithms allow the direct estimation of controller parameters, but relied heavily on a model of the process to be controlled. See Astrom, K. J. *Introduction to Stochastic Control Theory*, Academic Press, 1970. Recent work, however, focused on explicit algorithms.

These algorithms estimate parameters by a discrete process model and subsequently calculate controller parameters. See Fortesque, T. R., L. Kershenbaum and B. Ydstie, "Implementation of Self-Tuning Regulators with Variable Forgetting Factors", Automatica, 17,1981; Ydstie, B. E., "extended Horizon Adaptive Control", IFAC World Congress, Budapest, 1984; and Leal, R. L. and G. Goodwin, "A Globally Convergent Adaptive Pole Placement Algorithm Without a Persistency of Excitation Requirement", Proc. CDC, 1984. While explicit algorithms require more calculations than implicit algorithms, these are less dependent on model structure and are, therefore, more suitable for general purpose application.

A self-tuning control system which relies on a variable forgetting factor is known from Fortesque, T. R., "Work on Astrom's Self-Tuning Regulator", Dept. of Chem. Engr. Report, Imperial College, London, 1977. This article addresses several of the practical difficulties associated with self-tuning control.

Self-tuning control systems also utilize a feed forward index or control. Feed forward control is of two types: steady state and dynamic. Parameters transferring the feed forward index to a specific control action or function f(x,t), as shown in FIG. 4 herein. Classical gain scheduling is shown in FIG. 2 herein. This is a form of adaptive control that uses apriori process information to enchance control system performance. Through this mechanism, a control engineer can incorporate process design data and operating experience into the control system. Inclusion of this knowledge diminishes the impact of process changes and disturbances on controller performance. Gain scheduling uses a fixed equation or gain schedule to relate a measured index variable to desirable tuning parameters. The gain scheduling updates controller tuning parameters.

U.S. Pat. No. 4,563,735 to Huroi et al discloses an adaptive feed forward control system for adapting feed forward coefficients to a variable disturbance in a steady state. The feed forward coefficient method is adapted however, only at individual operating points. There is no teaching that the data should be collected over the entire operating range of the disturbance and fitted into a correction polynomial to be added to the feed forward signal.

U.S. Pat. No. 4,349,869 to Prett et al discloses a feed forward optimization system for continuously recalculating feed forward responses using a least-squares regression algorithm. This patent also teaches the use of a limiting mechanism for allowing the feed forward correction only in a steady state and providing an upper limit on the feed forward correction for stability purposes. This reference also relies on a minimization technique which is based on an internal model of the process. No provision for updating the feed forward model is provided.

An article by one of the co-inventors of the present invention which post dates the present invention is Lane, J. D., "Description of a Modular Self-Tuning Control System", Proc. ACC, 1986. This article discloses how heuristics can be included in a parameter estimation function. Also see Parish, J. R., "The Use of Model Uncertainty in Control System Design with Application to a Laboratory Heat Exchange Process", M. S. Thesis, Case Western Reserve University, Cleveland, 1982, which describes a parameter estimation algorithm with a first order internal model controller.

SUMMARY OF THE INVENTION

An object of the present invention is to provide a self-tuning control which solves a wide range of industrial control problems. The self-control of the present invention adapts a modular implementation. This provides flexibility in controller design. A central feature of the invention is the use of a parameter estimation module that implements a recursive least squares algorithum with a variable forgetting factor. Additional modules provide conversion from the estimated parameters into controller tuning parameters. Individual modules provide conversion for various control algorithms. Implementation of these modules as standard function code blocks allows the user to tailor the self-tuning control system to specific needs. The self-tuning control system of the invention also employs a significant amount of heuristics to overcome the many practical difficulties of adaptive control theory. Further, a separate module provides self-tuning gain scheduling.

It is noted that all of the modules of the present invention are individually known in the art. Their combination however, provides a unique and flexible solution to the problem of process control. Each of the modules can be implemented in a NETWORK 90 control device. NETWORK 90 is a registered trademark of the Bailey Controls Company of Babcock and Wilcox Co., a McDermott Company.

Characteristics of the inventive self-tuning control system make it suitable for general purpose application.

According to the invention, the estimation function is separated from the control function to enhance modular design. This separation allows for the use of a single parameter estimation algorithm in conjunction with multiple control algorithms. Parameter conversion modules provide the necessary interconnection between the parameter estimator and the various control functions. Each parameter conversion module calculates tuning parameters for a specific type of controller from the estimated process model. In addition a smart gain scheduling module increases the flexibility and performance of the self-tuning control system. The modular structure takes advantage of many features available from microprocessor-based distributed control systems. These features include several classical control algorithms, ease of configuration and flexibility.

Four classes of algorithms comprise the inventive self-tuning control system. These components are parameter estimation functions, parameter conversion functions, process control functions, and a smart gain scheduler.

The steady state parameter estimate is also continuously updated by biasing the conventional feed forward control. This reduces the requirement for periodic updating. The bias correction originates from a polynomial equation whose input is the feed forward index. The coefficients of the polynomial are continuously being updated by an on-line regression computation. Limits are placed on the bias correction for stability. Inputs to the regression algorithm are the feed forward index and the instantaneous bias offset (computed bias plus regulatory control signal). Regression is performed by selectively taking on n points equally spaced over the range of the feed forward index signal. The computed coefficients are in turn used by the polynomial equation.

Accordingly an object of the present invention is to provide a self-tuning system for controlling a process based on a measured parameter from the process comprising a modular parameter estimator for receiving the measured parameter and for calculating an estimated parameter using an estimation algorithm, a modular PID parameter converter connected to the parameter estimator for converting the estimated parameter into a proportional plus integral plus derivative control signal, a modular IMN parameter converter connected to the parameter estimator for converting the estimated parameter into an internal model control signal based on an internal model algorithm for the process, a modular user defined parameter converter connected to the parameter estimator for converting the estimated parameter into a user defined control signal, a modular PID controller connected to the PID converter, for controlling the process, an IMC controller for controlling the process according to an internal model control signal, a user defined controller connected to the user defined parameter converter for controlling the process and a gain scheduler connected between the IMC parameter converter and the IMC controller for modifing the output of the IMC parameter converter according to an algorithm mimicing the dynamic characteristics of the process.

A further object of the invention is to provide a feed forward index in the gain scheduler which utilizes a polynomial equation and a regression algorithm coefficient for the polynomial equation for modifying the IMC signal.

A still further object of the invention is to provide a self-tuning system for controlling a proces which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
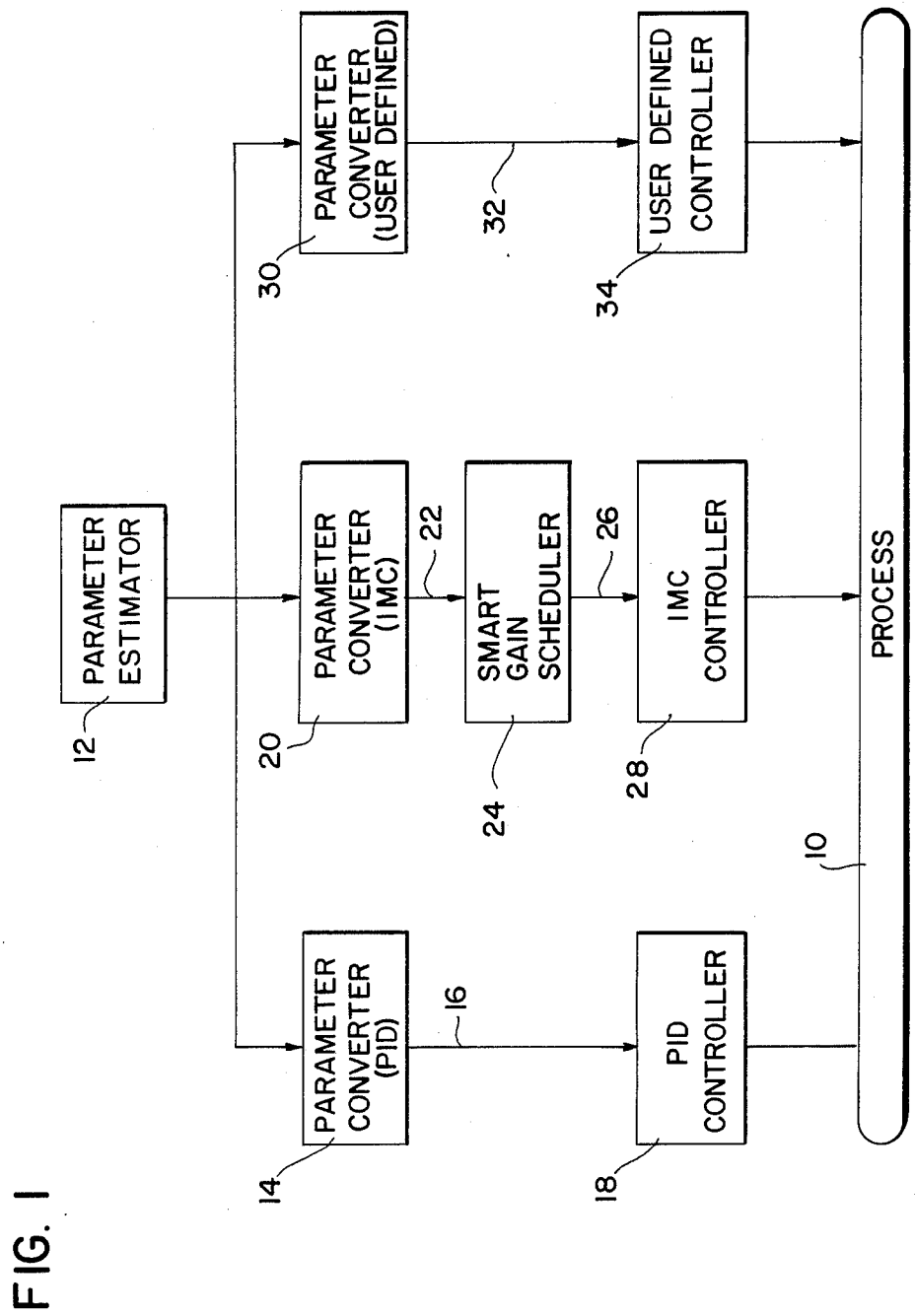
FIG. 1 is a block diagram showing the self-tuning system of the present invention.

Referring to the drawings in particular, the invention embodied in FIG. 1 comprises a self-tuning system for controlling a process 10 which has a modular parameter estimator 12 which receives signals corresponding to one or more parameters as measured from the process 10 and which utilizes estimator algorithms to convert that measured or those measured parameters into estimated parameter values. The estimated parameter values are applied to each of three parameter converters. Each of these are also modular in design.

The PID or proportional plus integral plus derivative converter 14 produces a PID control signal on line 16 which is applied to a conventional PID controller 18 for controlling the process 10. An IMC or internal model controller parameter converter 20 is also connected to the parameter estimator 12 and produces a control signal on line 22 which follows an internal model algorithm that is modelled after the process 10. This signal is modified in a smart gain scheduler 24 before it is applied as an ultimate control signal over line 26 to an IMC controller 28.

A user defined parameter connector 30 is also connected to the parameter estimator 12 and receives an input that is applied by a user to change the process in a desired way. This generates a user defined control signal on line 32 which is applied to a user defined controller 34 for controlling the process 10.

The modular design shown in FIG. 1 does not require any special hardware or firmwear. Individual modular components of this system take the form of standard function code blocks which are all available in a NETWORK 90 system. The firmwear library resident on individual micprocessor-based control modules allows access to these function codes. Specification of a self-tuning control configuration requires the selection and interconnection of an appropriate estimation and conversion block in addition to the base control configuration.

The estimation algorithm in the modular parameter estimator 12 utilizes a set of rules which govern its operation. The parameter estimator continually monitors its output. This function code prevents use of its estimates when they are inaccurate and resets the algorithm when unfavorable conditions persist.

A complete description of the estimation algorithm can be found in the above-identified articles to Fortesque, Kershenbaum and Ydstie of 1981 and the 1984 article by Ydstie.

The initial parameter estimation function code calculates parameter estimates for a discrete first order plus dead time dynamic model. Inherent in this formulation is the assumption that the process can be adequately modeled by this form.

$$y(t) = -a1 \cdot y(t-1) + b0 \cdot u(t-k) + c \tag{1}$$

where
 y(t)=current process measurement
 y(t-1)=previous process measurement
 u(t−k)=control output at sample t−k
 a1,b0,c=estimated model parameters
 k=process dead time
The following equations define the estimation algoriothm.

$$e(t) = y(t) - \theta'(t-1)\phi(t) \tag{2}$$

$$w(t) = \phi'(t) P(t-1)\phi(t) \tag{3}$$

$$\theta(t) = \theta(t-1) + [P(t-1)\phi(t) e(t)]/[1+w(t)] \tag{4}$$

$$\lambda(t) = n[1+w(t)]/[n[1+w(t)] + e^2(t)] \tag{5}$$

$$P(t) = P(t-1)/\lambda(t) \ [I - \phi(t)\phi'(t)P(t-1)/[\lambda(t)+w(t)]] \tag{6}$$

where
 $\theta(t)=[a1, b0, c]$
 $\phi(t)=[-y(t-1), u(t-k), 1]$
 n=Time horizon for forgetting factor
 $\lambda(t)$=Variable exponential weighting factor
 e(t)=Process model mismatch
 P(t)=gain vector
A more detailed description of the heuristics included in the parameter estimation function code appear in the above-identified article by Lane of 1986.

Parameter conversion in the PID converter 14 and the user defined converter 30 are of known design.

The internal model controller parameter converter 20 utilizes a parameter estimation algorithm with a first order internal model controller. Such a controller is described in the above-identified article to Parrish 1982.

Three factors suggested the use of the IMC converter. The algorithm used in this converter provides for dead time compensation, a feature not readily available in the PID controller. Second this algorithm uses estimates of the process gain and time constant as its primary tuning parameters. These parameters allow easy interpretation of accuracy. Thirdly, the controller is currently available in production firmwear.

To use the internal model controller algorithm, the user must specifiy the estimated process dead time, time constant and gain and select a tuning time constant. The self-tuning controller estimates discrete model parameters, converts these to an estimate of process gain and time constant and updates controller parameters with these values. The user must specify the observed process dead time and a tuning time constant. This tuning time constant dictates the desired speed process response The parameter conversion function code transforms discrete parameter estimates into tuning parameters for the internal model controller. The parameter estimator generates estimates for the following process model.

$$y(t) = \frac{b0}{1 + a_1 z^{-1}} u(t-k) \tag{7}$$

Development of the internal model controller assumed a discrete process model in the form.

$$y(t) = \frac{\frac{k\Delta t}{\tau + \Delta t}}{1 - \frac{\tau}{\tau + \Delta t} z^{-1}} U(t-k) \tag{8}$$

where
 k=process gain
 $\tau$=process time constant
Therefore, the conversion algorithm must convert parameters a1, b0 and c into parameters k and $\tau$.

Figure 2:
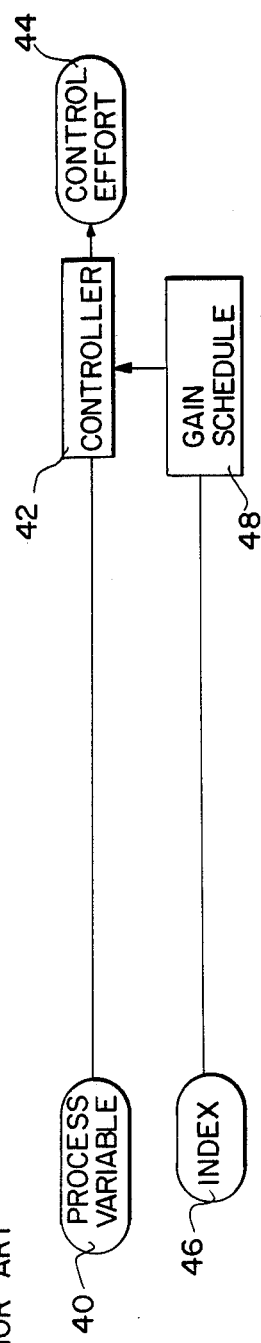
FIG. 2 is a block diagram showing a prior art arrangement for modifying the control signal of a controller based on an index for gain scheduling.

Referring now to FIG. 2, a classical gain scheduling is illustrated. A process variable 40 which is measured from the process is applied as an input to a controller 42 which produces a control function 44. In addition, an index 46 is fed forward through a gain schedule algorithm, 48 as a second input to the controller 42 to modify the effect of the process variable 40.

This is a form of adaptive control that uses apriori process information to enhance control system performance. Gain scheduling however, uses a fixed equation or gain schedule to relate a measured index variable to desired tuning parameters. The gain schedule updates controller tuning parameters as a function of the index variable.

While scheduling continuously modifies controller parameters to reflect current process conditions, conventional control systems rely on periodic, manual tuning. As a result, gain scheduling provides tighter control tuning, especially in response to short duration changes or disturbances. Gain scheduling is also superior to self-tuning control for processes affected by sudden changes in their dynamic characteristics.

A process which is well suited to the application of gain scheduling exhibits significant dynamic changes as a function of measurable variables. Conventional control systems, not benefiting from the application of gain scheduling, require detuning to maintain adequate performance over their entire range of operating conditions. Detuning results in sluggish process performance during certain modes of operation. Gain scheduling, on the other hand, provides a mechanism for maintaining tighter control tuning over wide operating ranges.

Figure 6:
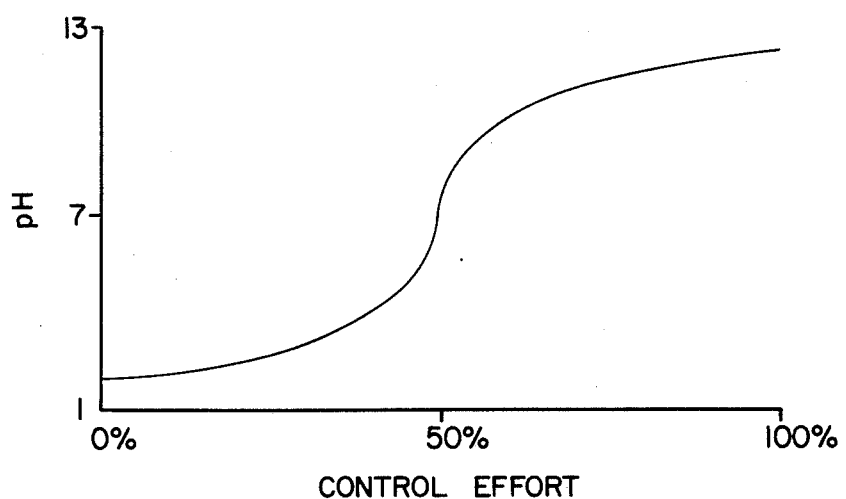
FIG. 6 is a graph plotting a control action against PH and illustrating a titration curve.

The control pH exemplifies the type of problem that warrants the application of gain scheduling. A titration curve is shown in FIG. 6 which presents the typical relationship that exists between control action and pH. This type of process exhibts highly non-linear dynamic characteristics as a function of pH. Commonly, these processes exhibit more than an order of magnitude change and process gain over their operating range.

Figure 7:
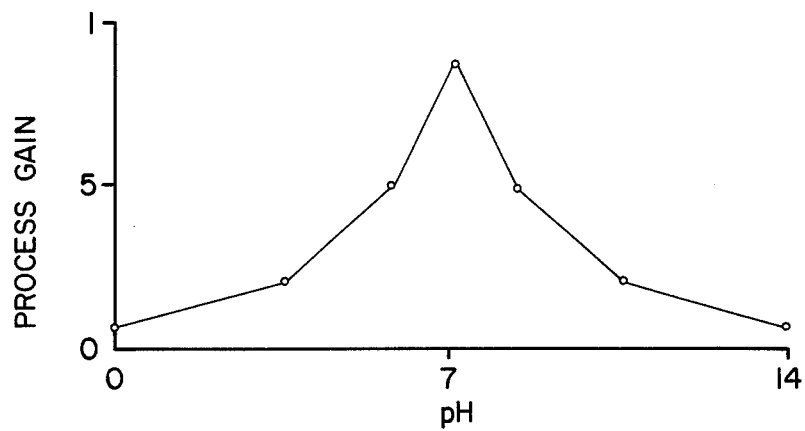
FIG. 7 is a graph plotting pH against a process gain for controlling the pH and following a plurality of linear segments.

Gain scheduling for pH processes uses a piecewise linear function which is illustrated in FIG. 7, to map the measured pH into a required controller gain. This mapping provides a mechanism for adjusting the gain of a conventional functional feedback controller as a function of pH. Thus, gain scheduling compensates for the non-linear characteristics of pH, enhancing process performance.

Rarely in practice are the full benefits of gain scheduling realized. These mechanisms typically suffer from poor design and tuning. Also, plant personnel often lack the knowledge, experience or time to retune these mechanisms in response to changing process conditions. As a result, the performance improvements available from this advance control technique are diminished.

Figure 3:
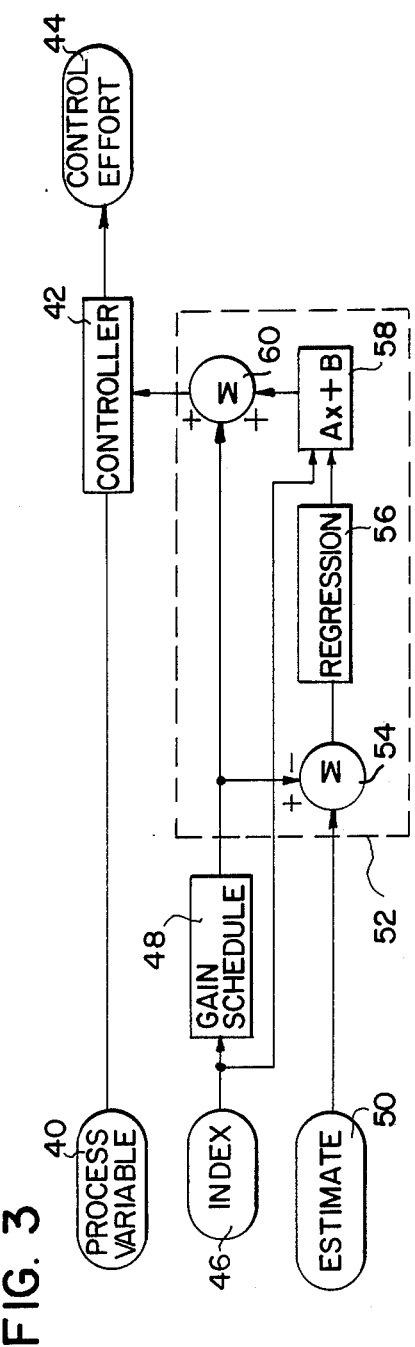
FIG. 3 is a block diagram showing the inventive adaptive gain scheduling.

According to the present invention, a smart gain scheduler illustrated in FIG. 3, increases the level of process performance above that realized from conventional mechanisms. This system utilizes the same structure and equations as the standard gain scheduler shown in FIG. 2. In addition, the smart gain scheduler updates its gain scheduling equation based on a measurement of control system performance or process conditions.

Conventional gain scheduling maps a single variable, namely the index 46, into an appropriate controller parameter or parameters, the output or control effect 44. As noted above, gain schedules are typically piecewise linear functions or simple algebraic expressions. The output from the gain scheduler adapts a controller parameter or parameters. While gain scheduling usually adjusts controller gain, scheduling of other parameters is not uncommon and often desirable.

Figure 8:
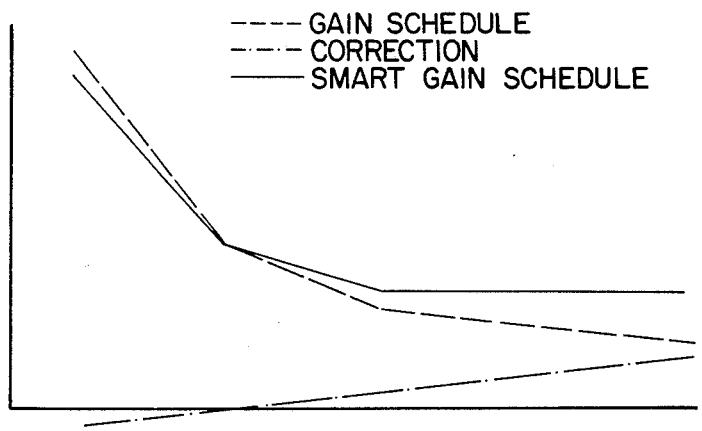
FIG. 8 is a graph showing the addition of a liner correction equation to a fixed gain schedule, and how this generates a smart gain schedule.

The smart gain scheduler of FIG. 3 enhances conventional gain scheduling through the inclusion of a self-tuning feature shown at 52. In this self-tuning feature 52, the fixed gain schedule from gain schedule 48 is added in an adder 60 to a liner correction equation 58. The smart gain schedule accounts for poor design and tuning of the fixed gain schedule and for process changes. FIG. 8 is a graph which shows how a conventional gain schedule (dash line) differs from a smart gain schedule (solid line) and the correction (phantom line) therebetween.

The use of a correction equation shown at 58 in FIG. 3 distinguishes the inventive smart scheduling from conventional gain scheduling. This equation expresses the observed error in the fixed gain schedule as a function of the index variable. Initially, the correction equation has a slope and intercept of zero, forcing the smart gain schedule to coincide with the fixed gain schedule. As estimates from estimator 50, of a correct value for the scheduled parameter become available, the smart gain scheduler updates the correction equation by obtaining a difference in adder 54 between the conventional gain schedule 48 and the estimated gain schedule 50. This diference is applied to a regression function 56 which generates part of the liner equation in 58.

It is noted that all of the function blocks in self-tuning feature 52, as well as the other function blocks shown in FIGS. 1 and 3, are of modular design and can be be implemented by the NETWORK 90 system.

Regression function 56 applies a least-squares regression analysis to generate the correction equation from data relating the error in the fixed gain schedule to an index value which is supplied directly from the index 46 to the liner correction equation 58.

The difference between the output of the fixed gain schedule 48 and the estimate of the correct parameter value 50 then form the error term used for regression in 56. The data generated by the liner correction equation 58, as noted above, is added to the conventional gain schedule from 48.

A special bin structure stores the historical data required for regression analysis. This data storage method guarantees universal application of the correction equation. It divides the expressed range of index values into ten intervals or bins of equal length. Each bin contains an error value and its corresponding index value. Initially, the index value in each bin points to the middle of the bin and the error value contains zero. Regression on this set of data generates the initial correction equation 58. Changes in the estimated parameter input value from 50 trigger the updating of the correction. For the updating process the smart gain scheduler associates a bin number with the correct value of the index variable. Current values for the error and index replace the existing values in the indicated bin. Regression on data contained in the ten bins generates a new correction equation.

A description of how the NETWORK 90 system can be utilized to establish these bins, can be found in APPLICATION GUIDE AG-0000-911 entitled "BAILEY NETWORK 90 LINEAR REGRESSION OF SAMPLE DATA".

Figure 4:
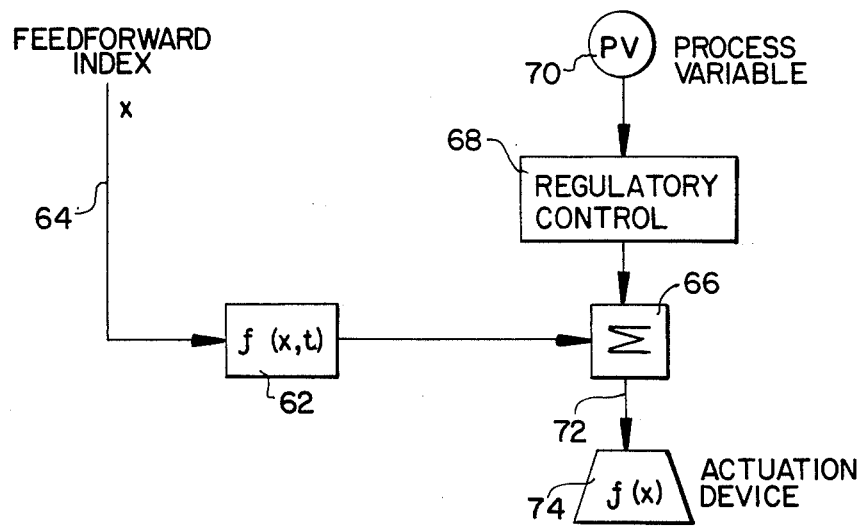
FIG. 4 is a block diagram showing a prior art arrangement for applying a feed forward index to a control action.

FIG. 4 illustrates a feed forward index arrangement which is somewhat similar to the arrangement of FIG. 2.

This too is a prior art arrangement wherein a specified control action 62 based on a feed forward index 64 was applied to a summing unit 66 which added the feed forward control action to a standard control action from a regulartory control 68 which responded to a measured process parameter or variable 70. Control action 72 was then applied into an actuation device 74 that controls some aspect of the process.

Figure 5:
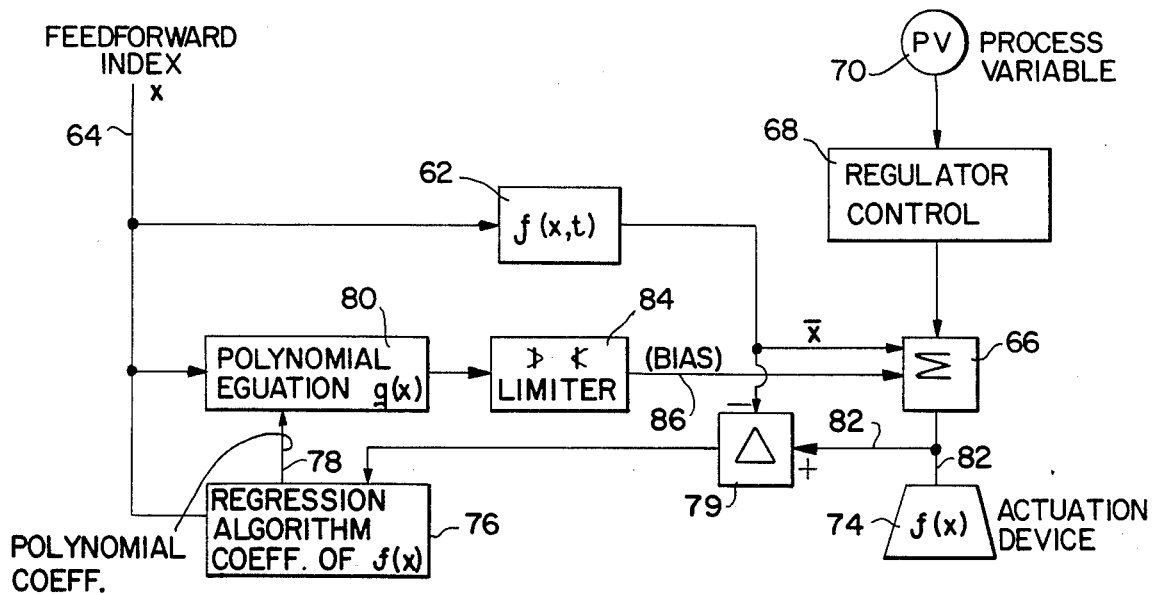
FIG. 5 is a block diagram showing an arrangement for modifying a feed forward index using a polynomial equation and regression algorithm coefficient for the polynomial equation.

FIG. 5 illustrates another feature of the present invention wherein the feed forward index 64, while continuing to generate the conventional control action 62, also includes a regression algorithm coefficient generating function block 76 which takes the feed forward index 64 and generates a polynomial coefficient 78 for a polynomial equation g(x)80. The regression algorithem has a second input from a summing unit 79 which finds the difference between the conventional control action 62 and the control action 82 which is tapped from the summing unit 66. This difference is applied as a fed back signal to the regression algorithm to generate the polynomial coefficient 78.

The output of the polynomial equation 80 is also subjected to limiting in a limiter 84 which precludes an overly high and an overly low control action.

The now biased control action 86 is applied to the summing unit 66 where it is added to the correction action 62 and to the conventional control action of regulatory controller 68, to produce the control action 82 for the actuator 74.

The embodiment of FIG. 5 reduces the requirement for periodic updating. It is noted that the regression is performed by selectively taking on n points equally spaced over the range of the feed forward index 64. The computed coefficients are in turn used by the polynomial equation 80.

Advantages of this arrangement include better control, which is less prone to degrading with time, and reduced maintenance. The improvement will enable advanced combustion control and steam temperature controls, etc. to be applied.

Figure 9:
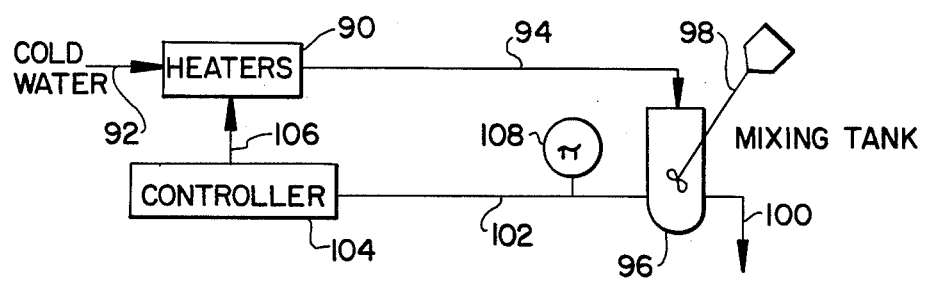
FIG. 9 is a block diagram showing a simple process which was controlled in accordance with the present invention to confirm the usefulness of the invention.

To confirm the usefulness of the present invention, a test was conducted utilizing a simple process which is schematically illustrated in FIG. 9.

In this process a set of three heaters 90 received cold water over an inlet 92 and supplied this heated water over line 94 to a mixing tank 96 whose contents were continually mixed by a mixer 98. A drain 100 released water from mixing tank 96 to maintain a constant level of water in the tank. Some of the water was fed back over line 102 to a controller 104 and then returned over line 106 to the heaters 90. A temperature transducer 108 measured the temperature in the return line 102 and provided a measured parameter to be used for the controller 104.

Either one, two or three of the heaters in 90 were activated to heat the water on line 94. The length of line 94 provided a sufficient amount of dead time for the process between the heaters 90 and the mixing tank 96., The mixer 98 was provided to mix the constant volume of water in tank 96 to attenuate fluctuations in the outlet water temperature as sensed by temperature sensor 108.

Control of the temperature of the mixing vessel 96 was the primary objective of the control system. The control system varied the power supplied to the individual heaters to control this temperature. Since the actual number of heaters in service at any time could be changed between one and three, the gain of the process would also change drastically. Switching from one to two heaters in service doubles the amount of heat added to the process, assuming a constant controller output.

Figure 10:
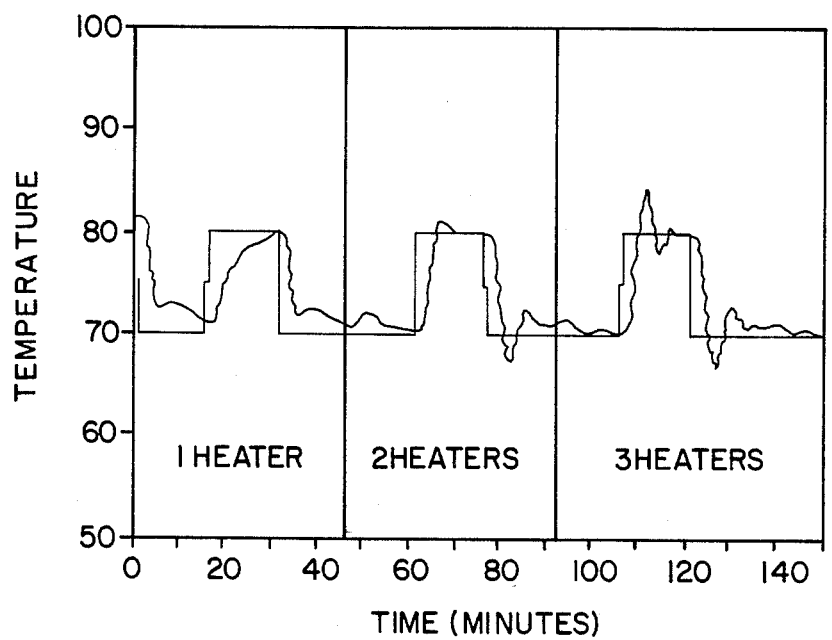
FIG. 10 is a graph showing time plotted against temperature and illustrating the control action as well as the response for constant gain scheduling.
Figure 11:
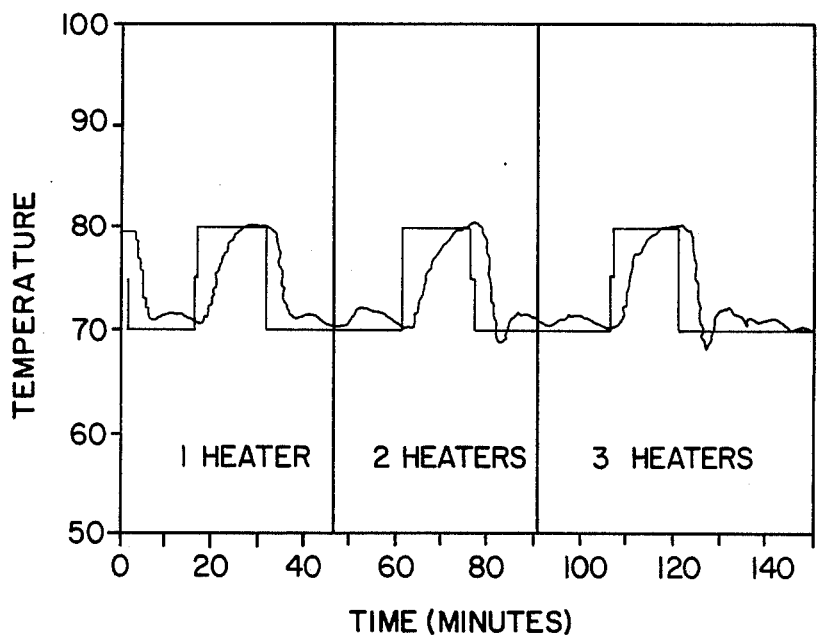
FIG. 11 is a graph similar to FIG. 10, but showing a linear gain schedule.
Figure 12:
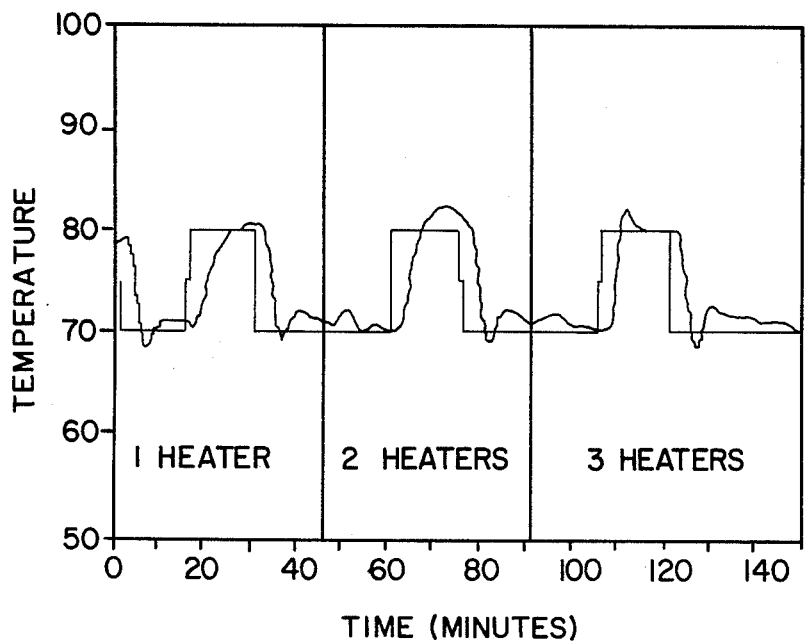
FIG. 12 is a graph similar to FIG. 11 but showing a self-tuning control.

Process conditions used for testing were a water flow rate of 0.5 gallons per minute, a mixing tank volume of 2.5 gallons and one to three heaters in service. Analysis of step response data at these operating conditions revealed second order dynamic behavior for the process. Approximating step response data by a first order model suggested a time constant of five minutes, and a gain of 0.2 times the number of heaters in service. FIGS. 10, 11 and 12 show the results of different parts of the test including time against temperature as sensed by temperature sensor 108. Each graph also indicates the point at which one, two and three heaters were activated.

All testing started with a single heater in service and with a temperature set point of 70°. An automatic test sequencing program increased the set point to 80° and then returned it to 70° to complete one cycle. This program held each temperature set point for 15 minutes and placed an additional heater in service at the end of each set point sequence.

It is noted in general that the results from these three separate tests show the flexibility of the self-tuning control system.

The self-tuning controller used in conjunction with the smart gain schedule scheduler, all of which were incorporated into controller 104 in FIG. 9, assumed first order process behavior. Initial values for this controller were a gain of 0.5, a time constant of 5 minutes and a dead time of 2.5 minutes. A measurement of the number of heaters in service form the index used by the smart gain scheduler.

FIG. 10 shows the temperature profile (curved line) obtained during smart gain scheduling with a poor initial gain schedule. Use of a constant gain schedule of:

$$0.25 + 0.00 \times \text{ (number of heaters in service)}.$$

Figure 13:
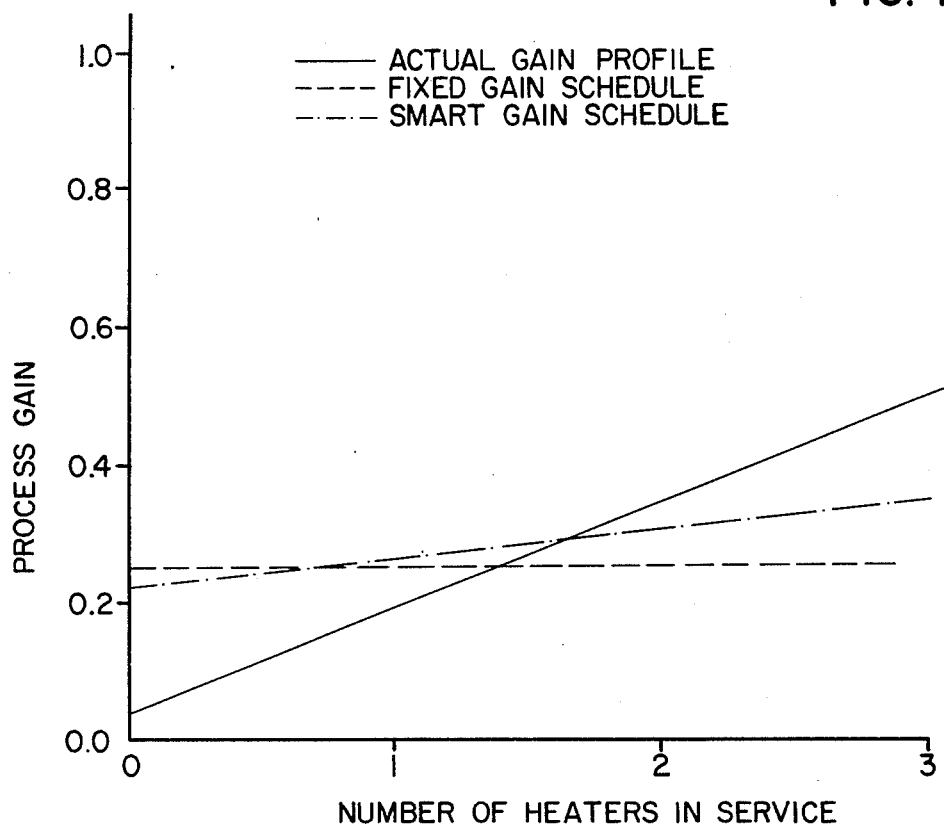
FIG. 13 is a graph plotting the number of heaters against the process gain for the system of FIG. 9 as controlled in accordance with the invention.

This constant gain schedule showed the ability of the smart gain scheduler to update its scheduling equation. FIG. 13 shows a comparison between the actual process gain profile against the initial fixed gain schedule and the smart gain schedule.

While poor control resulted from the initial gain schedule, performance improved as the smart gain scheduler identified process characteristics. Correction of data in only five of the total ten bins during this test prevented further updating of the gain schedule.

FIG. 11 shows the temperature profile obtained during smart gain scheduling with a good initial gain schedule. The gain schedule was given by:

$$0.00 + 0.18 \times \text{ (number of heaters in service)}.$$

Figure 14:
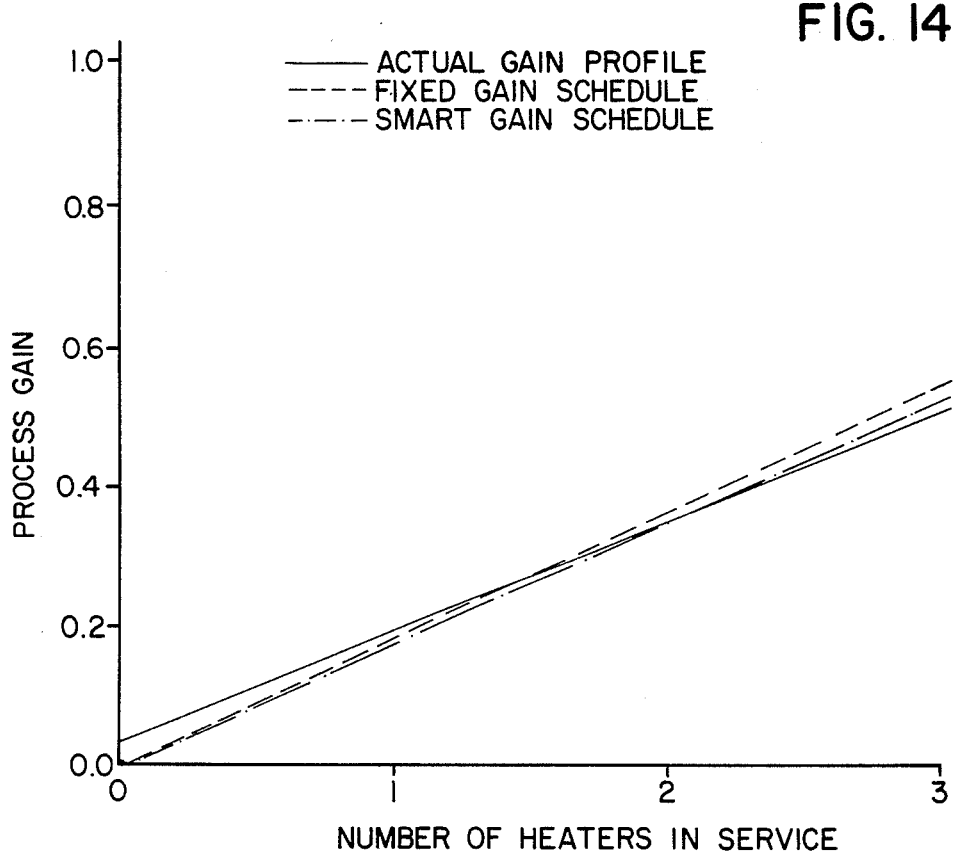
FIG. 14 is a graph similar to FIG. 13 comparing the actual gain profile and initial and final gain schedule.

This illustrates the type of performance available through the application of gain scheduling. After sufficient data collection, the smart gain scheduler identifies a gain schedule close to that given above, independent of its starting point. FIG. 14 shows a comparison between actual gain profile and initial and final gain schedule for this test.

FIG. 12 represents the temperature profile obtained using self-tuning control without the gain scheduling feature. For this series of tests, the advantages of gain scheduling are not clearly evident. Nevertheless for processes that experience large gain changes over short periods of time, advantages are significant. This is due to the self-tuning controllers ability to update immediately in response to process changes.

While specific embodiments of the invention have been shown and described in detail to illustrate the application of the principles of the invention, it will be understood that the invention may be embodied otherwise without departing from such principles.

What is claimed is:

1. A self-tuning system for controlling a process in response to three independent control paths having at least one measured parameter common to all three control paths comprising:
   a modular parameter estimator receiving the measured parameter and for heuristicly calculating an estimated parameter using an estimation algorithm;
   a modular PID parameter converter connected to said estimator for applying a proportional plus intergral plus derivative algrithm to the estimated parameter to produce a PID control signal;
   a PID controller connected to said PID parameter converter for controlling the process in a conventional manner;
   a modular IMC parameter converter containing an internal model algorithm and connected to the estimator for utilizing the internal model algorithm of the converter by the estimated parameter to generate an interm model control signal;
   gain scheduling means connected to the modular IMC parameter converter for receiving the internal model control signal to generate a gain scheduled control signal;
   an IMC controller connected to said gain scheduling means for receiving the gain scheduled control signal for controlling the process through a compensation control signal aiding said conventional process control;
   a modular user defined parameter converter connected to the estimator for receiving the estimated parameter and for generating an estimated parameter control signal; and
   a user defined controller connected to said user defined parameter converter for receiving the user defined control signal to control the process through a user applied control signal.

2. A system according to claim 1, wherein said gain scheduling means comprises a constant gain scheduler for applying a constant gain schedule algorithm to the index to generate a constant gain schedule signal, a feed forward signal estimator for estimating a feed forward signal, a first summer for taking the difference between the constant gain signal and the estimated feed forward signal to produce a difference signal, a regression unit connected to said first summing unit for applying regressive analysis according to a regression algorithm to the difference signal, a polynomial equation unit connected to said regression unit for receiving a regression signal from the regression unit and applying it to a polynomial equation, said index being connected to said polynomial equation unit for including said index as a factor of the polynomial equation, and a second summing unit connected to said constant gain scheduler and said polynomial equation unit for adding the outputs thereof and for applying the added outputs to said IMC controller.

3. A system according to claim 1, wherein said gain scheduling means comprises a control action unit connected to said feed forward index for generating a controlled action signal as a selected fixed function of the index, a polynomial equation unit connected to said feed forward index for subjecting the feed forward index to a polynomial equation, a limiter connected to said polynomial equation unit for limiting the upper and lower values of the output of the polynomial equation unit, a first summing unit having one input from said IMC controller, one input from said control action unit and one input from said limiter and for generating a corrected control action signal for application to the process, a difference unit connected to said control action unit and to the output of said summing unit for taking the difference between the controlled action signal and the corrected control action signal, and a regression algorithm coefficient unit connected to the output of said difference unit and having an input connected to said index, said regression algorithm coefficient containing a regression algorithm for generating a polynomial equation, said regression algorithm coefficient unit being connected to said polynomial equation unit for applying said polynomial coefficient to said polynomial equation unit for applying said polynomial coefficient to said polynomial equation.

4. A method of controlling a process according to a measured parameter, comprising subjecting the measured parameter to a parameter estimation function to develop an estimated parameter, applying the estimated parameter to a proportional plus integral plus derivative conversion to develop a PID control signal for use in controlling the process in a conventional manner, applying the estimated parameter to an internal model parameter which models the process to develop a modelled control signal, applying a feed forward index which represents one characteristic of the process to a gain schedule algorithm to calculate a fixed gain schedule signal, combining the fixed gain schedule with the modelled control signal to produce a combined control signal and controlling the process in addition according to the combined control signal.

5. A method according to claim 4, including subjecting the modelled control signal to regression analysis to produce a regression signal, and applying the regression signal with the index in a polynomial equation to form the control signal for the process.

6. A method according to claim 5, including limiting the output of the polynomial equation to within upper and lower limits.

* * * * *